United States Patent
Riesterer

(10) Patent No.: US 6,557,597 B2
(45) Date of Patent: May 6, 2003

(54) FOODSTUFF REFILL AND DEVICE INTENDED TO ACCOMMODATE SUCH A REFILL

(75) Inventor: Alain Riesterer, Vevey (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/953,018

(22) Filed: Sep. 14, 2001

(65) Prior Publication Data

US 2002/0033103 A1 Mar. 21, 2002

(30) Foreign Application Priority Data

Sep. 15, 2000 (EP) .............................. 00203185

(51) Int. Cl.[7] .............................. B65B 1/04; B65B 3/00; B67C 3/00
(52) U.S. Cl. .................... 141/351; 141/352; 141/363; 141/364; 141/365; 141/366; 99/295
(58) Field of Search ................................ 141/351, 352, 141/363–366; 99/295; 426/431–433

(56) References Cited

U.S. PATENT DOCUMENTS 4,469,258 A * 9/1984 Wright et al. ............ 229/123.1
4,614,286 A    9/1986 Yamaguchi et al. ........ 222/505
4,858,821 A * 8/1989 Bickelhaupt ............. 229/123.1
5,246,126 A    9/1993 Lewis, Jr. ................. 215/303

FOREIGN PATENT DOCUMENTS

| EP | 0 387 986 A2 | 9/1990 |
| EP | 0 419 290 A2 | 9/1996 |
| EP | 1 028 068 A1 | 8/2000 |
| JP | 58014865     | 1/1983 |

* cited by examiner

Primary Examiner—Timothy L. Maust
(74) Attorney, Agent, or Firm—Winston & Strawn

(57) ABSTRACT

A foodstuff refill (2) intended to be inserted in a foodstuff supply zone of a device for metering, dispensing and/or preparing food products; the refill comprising a container (20) for the foodstuff; a passage (24) for releasing the foodstuff; edges (21) of the device, including at least one pair of first opposed edges (210a, 210b), a film (25) for sealing the passage to form an enclosed space (26); a member (3) for detaching the film from the container; the detachment member including at least one catch member (4) intended to engage a retaining lip of the device when the refill is inserted into the device. The detachment member (3) is secured to the film (25) and is able to be connected to the refill in such a way as to be movable in sliding along the first edges of the device (210a, 210b) to cause the at least partial opening of the film (25) in response to the engagement of the refill in the device.

20 Claims, 5 Drawing Sheets

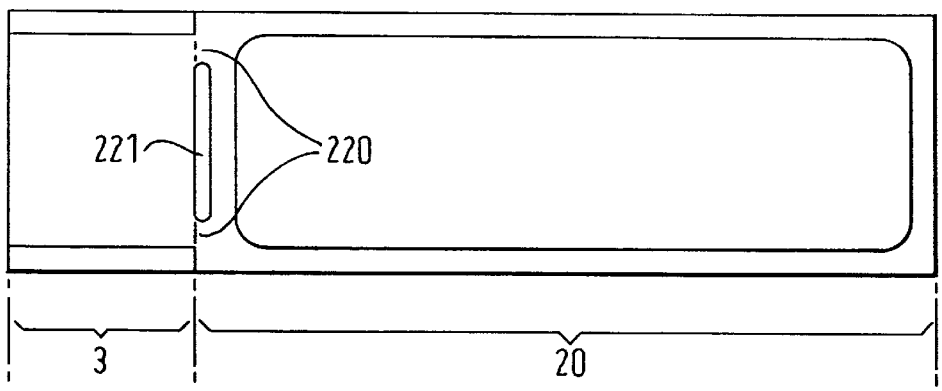
FIG. 13
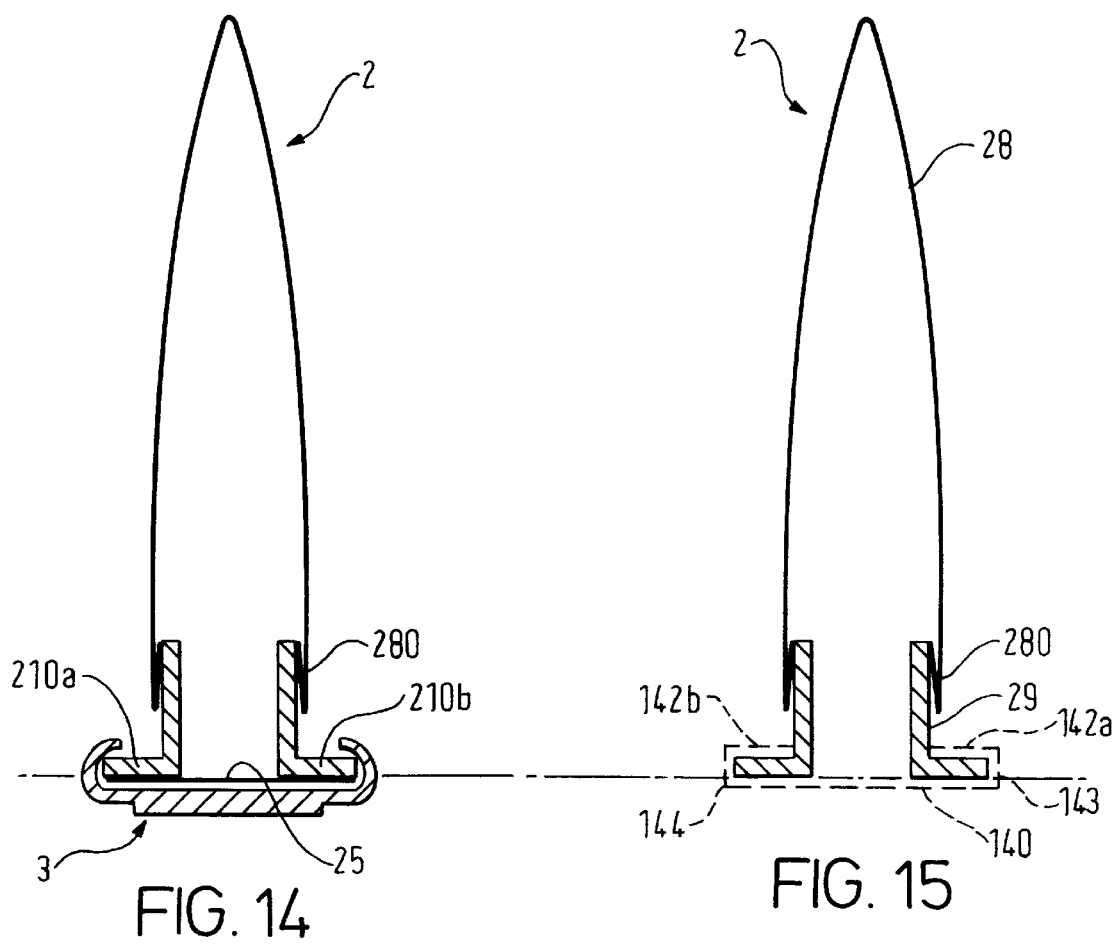
FIG. 14
FIG. 15

FOODSTUFF REFILL AND DEVICE INTENDED TO ACCOMMODATE SUCH A REFILL

BACKGROUND

The invention relates to the field of devices for metering, dispensing and/or preparing food products such as beverages, sauces or other similar products. The invention is aimed more particularly at a refill comprising a supply of a foodstuff for such devices. The invention has numerous applications in the food service industry, particularly with regard to the dispensing of beverages in public places or in catering services of transport facilities such as aircraft or trains.

Devices for dispensing and/or preparing beverages or other ready-prepared products have to be supplied with foodstuff regularly and in sufficient quantity to be able to provide the consumer with a continuous and uninterrupted service. In general, these devices are supplied manually by filling reservoirs with a foodstuff packaged "loosely" in hermetically sealed tins or bags. This method is not satisfactory because it entails handling operations as well as the time needed to perform these handling operations. The handling operations, if conducted carelessly, can lead to a mess and can carry the risk of a significant loss of foodstuff, particularly when the device is installed in unstable or turbulent conditions such as may be the case in an aircraft.

Devices do exist which are designed to accommodate cartridges or containers filled with soluble powdered substances which are opened before they are introduced into the device. British patent GB 1,325,478, for example, teaches this principle. In this particular instance, the container comprises an adhesive strip which is delaminated before the container is assembled into the device. A disadvantage of this device stems from the fact that the refilling operation is performed when the container is fully open, thus leading to the same disadvantages as those described above.

European patent application EP 1,028,068 proposes a solution to these problems by providing a refill cartridge designed to refill with foodstuff easily and quickly and without the risk of losing any foodstuff. This device is entirely suitable for use in demanding environments such as an aircraft compartment. The cartridge comprises a container containing a foodstuff and a closure means collaborating with the container to form an enclosed space. The closure means comprises means allowing the at least partial detachment of the closure means under the effect of the refill being introduced into the dispensing device. In particular, the detachment means comprises a free portion equipped with mechanical catching means intended to engage with at least one retaining part of the device, that complements the mechanical catching means, so as to hold the free portion in place in a configuration in which the free part is folded back onto the detachment means and thus ensure the at least partial detachment of the closure means with respect to the container. In this case, the detachment means thus forms a portion of the closure or sealing means, which is capable of being folded back onto the container in the configuration of engagement into the device.

A system such as this has numerous advantages in terms of convenience of use in that the introduction of the cartridge into the device is essentially enough to open the refill and therefore refill the device. Even so, additional features can provide even further advantages.

SUMMARY OF THE INVENTION

The present invention relates to a foodstuff refill designed to release its contents into an appropriate device without it being necessary for the refill to be opened beforehand, or it being necessary to provide integral cutting systems in the accommodating device.

The present invention makes the refilling operation more reliable and more safe. This is accomplished by ensuring a better distribution of the forces applied in order to open the refill so as to afford optimum safety on opening under all circumstances, so that any risk of rupture, crumpling or jamming of the means for sealing the refill as it is engaged in the device is avoided.

Another feature of the invention is to lessen the risk of accidental opening of the refill outside the device as well as to avoid partial or total deterioration and/or damage to the means used to open and/or seal the refill. What happens is that the refill is used as packaging for the foodstuff, and has therefore to be capable of storing it, over time, under vapor-tight and possibly also oxygen-free conditions. Any inadvertent rupture of the sealing means, however minimal it might be, can considerably reduce the shelf life of the foodstuff. Likewise, in the event of damage to the opening means, the refill may no longer be able to be opened properly, and the refill may therefore become unusable.

Another feature of the invention is to provide a refill which can easily be stored in quantity, in a rational and compact way without wasting space so that they can be stored in a restricted space such as a box, a crate, a drawer, etc., thus providing maximum amount of product in a minimum volume.

These features are provided in a foodstuff refill intended to be inserted in a foodstuff supply zone of a device for metering, dispensing and/or preparing pulverulent food products. This device has a retaining lip and at least one pair of first opposed edges. The refill preferably comprises a container for containing a quantity of pulverulent foodstuff; a passage for releasing the foodstuff; a plastic film for sealing the passage to form an enclosed space; a detachment member attached to one end of the film and comprising at least one catch member intended to engage the retaining lip of the device when the refill is inserted into the device, wherein the detachment member is connected to the refill in such a way as to be movable in sliding along the first edges of the device and cause the at least partial opening of the film means in response to the engagement of the detachment with the retaining lip of the device.

Another embodiment of the invention relates to an assembly comprising a device for metering, dispensing and/or preparing beverages which comprises a supply zone and at least one foodstuff refill intended to take up position in the zone. In this assembly, the refill is as described above, and the detachment member is capable of sliding in such a way that the introduction movement causes the at least partial delamination of the film and releases the foodstuff into the supply zone.

BRIEF DESCRIPTION OF THE DRAWINGS

The detailed description which follows is given by way of a non-limiting example, in which:

FIG. 13 shows part of the refill during manufacture;

FIG. 14 shows a schematic sectional view of an alternative form of the refill; and FIG. 15 shows a schematic sectional view of the alternative form of the refill of FIG. 14 after it has been introduced into the device.

DETAILED DESCRIPTION OF THE PREFERRED EMBODIMENTS

Figure 1:
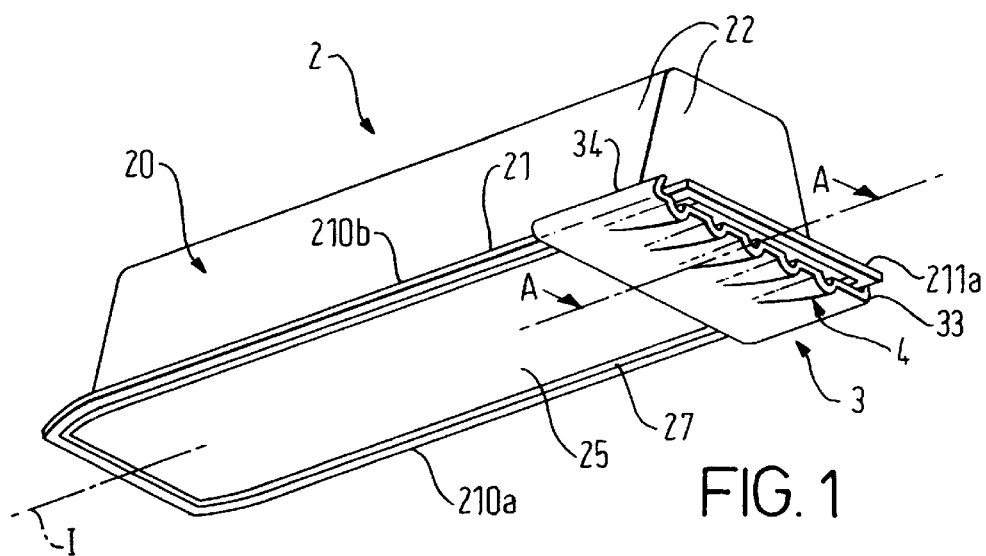
FIG. 1 depicts a perspective view of a refill according to the invention.

Further advantages of the invention will become apparent by reviewing these drawings in connection with the remainder of the description.

The invention relates to a foodstuff refill intended to be inserted in a foodstuff supply zone of a device for metering, dispensing and/or preparing beverages or the like. This refill comprises a container for containing a quantity of foodstuff; a passage for releasing the foodstuff; edges of the device, including at least one pair of first opposed edges, a means of sealing the passage to form an enclosed space; a means of detaching the sealing means; the said detachment means comprising at least one catching means intended to engage over a retaining means of the device when the refill is being engaged in the device. According to an essential particularity of the invention, the detachment means is secured to the sealing means and is able to be connected slidably along the refill, preferably along the first edges, so as to cause the at least partial opening of the sealing means in response to the engagement of the refill in the device.

Thus, the refill becomes more reliable on opening because the slidable mounting of the detachment means has the effect of evenly distributing the forces needed to detach the sealing means. Detachment occurs more uniformly, minimizing the risks of rupturing the sealing means; if this were not the case, the aperture needed to release the entirety of the foodstuff contained in the container could be impeded.

Thus, the detachment means preferably comprises means of connection with the said first edges which are flexible so that the detachment means can be arranged between a disengaged position and a connection position folded back onto the sealing means thus forming the position of engagement in sliding along the said sliding edges. A configuration such as this has the advantage of it being possible for the detachment means to be placed in the operational position of sliding along the sliding edges of the refill at any moment, for example, either during the manufacture of the refill or just prior to loading the refill into the device intended to accommodate it.

As a preference, the catching means of the detachment means, intended to engage in retaining means belonging to the device, are arranged in such a way as to form at least one abutment zone extending transversely with respect to the direction in which the refill is engaged in the device. As a preference, the direction of engagement of the refill corresponds to the longitudinal direction of this refill.

According to the invention, the sealing means is preferably a flexible film sealed onto the edges of the refill. The term "sealing" is to be understood as meaning any appropriate means of connection between the film and the edges and which has the characteristic of being able to be broken under the effect of sufficient mechanical traction. An action such as this is generally described by the terms "delamination" or "peeling". The sealing may thus comprise bonding, welding or a combination of these two means.

The invention also relates to the assembly comprising a device for metering, dispensing and/or preparing beverages or other food products comprising a supply zone and at least one foodstuff refill intended to take up position in the zone. As above, the refill comprises a container containing the foodstuff and a film capable of forming the bottom of the refill. The film is assembled on the edges of the container in such a way that it can be delaminated, and is secured to a detachment means. The detachment means comprises at least one mechanical catching means. The refill is placed in a supply zone that comprises a housing for accommodating the refill and at least one retaining means which collaborates with the singular or plural catching means at the time of introduction of the refill into the housing. The detachment means preferably comprises means for allowing the connection of the detachment means slidably with respect to the refill, such that the detachment means is capable of sliding in such a way that the movement of introducing the refill into the device causes the at least partial delamination of the film and releases the foodstuff into the supply zone.

Certain features and advantages of the device may be partially described in U.S. Pat. No. 6,289,948 (i.e., the U.S. equivalent to EP 1,028,068), the entire content of which is to be incorporated herein by reference thereto and of the current application.

The invention is now described in further detail through specific embodiments with reference to the drawing figures.

Figure 2:
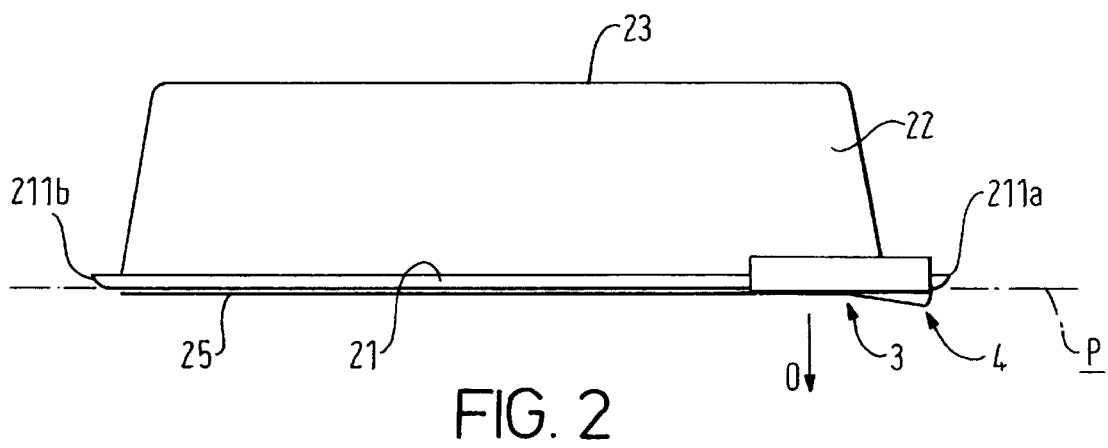
FIG. 2 shows a side view of the refill of FIG. 1.
Figure 3:
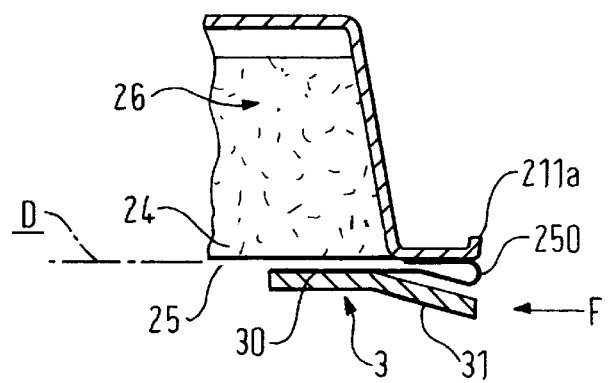
FIG. 3 shows a detail on section A—A of FIG. 1.

A refill 2 according to the invention is depicted in FIGS. 1 to 3. This refill has a container 20 for containing a predetermined quantity of foodstuff for refill purposes. Preferred foodstuffs are powdered substances of the coffee, tea or soluble milk type. The capacity of the container may vary and is determined according to the type of device to be refilled and according to the number of individual doses to be supplied after metering via metering means belonging to the device. For example, the container may comprise an amount of foodstuff equivalent to a number n of individual doses, it being possible for n to vary between 1 and 200.

In a first mode, the container 20 has the shape of an elongate tray extending in a longitudinal direction I, equipped with a top 23, walls 22 forming the sides of the tray which are extended by edges 21 more or less at right angles to the walls 22. A variation in the angle between the walls and edges can be tolerated, as shown in FIG. 2, where the angle is less than 90 degrees. In fact, angles of between 60 and 90 degrees are permissible and other angles may be possible depending upon the size of the container and the specific powdered substance utilized therein. The edges 21 form an approximately flat peripheral portion. The edges 21 thus delimit a passage 24 when the sealing means is absent. The edges have first opposed lateral edges 210a, 210b, arranged in the longitudinal direction I, and second transverse edges, namely a front edge 211a and a rear edge 211b.

The opening of the container is covered by a sealing means 25 which forms the bottom of the refill and closes passage 24. In this configuration, the mass of foodstuff constituting the refill can rest directly on the sealing means 25. The assembly formed by the container and the sealing means preferably defines a hermetically enclosed space 26. The term "hermetically" means that the sealing means prevents migration of at least one of water, water vapor or oxygen. For certain foodstuffs, hermetic enclosing of the space is not required and lesser performance sealing means can be used.

The edges 21 of the container extend around the perimeter of the container forming an approximately flat base that is more or less inscribed in a plane P, referred to as a sealing plane, so as to encourage both sealing of the sealing means 25 and the resting, stability and guidance of the refill in the device as will be explained in greater detail later.

As a preference, the sealing means is a flexible film sealed onto the edges 21 of the container, forming a closed continuous peripheral line 27. It is advantageous to provide a sealing means in the form of a heat-sealed film that is secured along the peripheral edges of the container. The film is preferably chosen from tear-resistant film or, in any case, films which have a resistance to tearing greater than the resistance to delamination of the sealing line when a force F is applied in a longitudinal direction parallel to the sealing plane P as illustrated in FIG. 3. Any one of a variety of thermoplastic films is suitable.

The sealing means 25 is secured at a free end to a detachment means 3. For that, the sealing means comprises, outside of the sealing zone defined by the line 27 and at the front of the refill, a portion 250 which can be folded or bent back onto a sealed portion at the front of the sealing means.

The detachment means 3 is mounted slidably with respect to the opposed longitudinal edges 210a, 210b. It preferably consists of a component which is somewhat rigid or semi-rigid with respect to the sealing film. A rigid thermoplastic material is advantageous to assist in bonding to the sealing film. The detachment means has an internal contact surface 30 to which the sealing film adheres by bonding, fusion, welding or any other means. On its external face 31, the detachment means comprises mechanical catching means 4 intended to collaborate in abutment with retaining elements belonging to the device. The detachment means 3 can be any member that is capable of engaging the lip of the dispenser housing into which the refill is inserted. It is possible to utilize a bar, rod, ridge, bump, pin or other projection for this purpose. Other suitable and more preferred detachment means will be explained herein.

The detachment means also has sliding means 33, 34 which are capable of engaging the edges 210a, 210b of the housing of the dispenser to facilitate the sliding insertion of the refill into the dispenser housing. The sliding means preferably form lateral ends which are curved in the direction of the edges of the container when the portion is in the position in which it is folded back onto the sealing means. These sliding means 33, 34 provide the connection between the detachment means and the sliding edges 210a, 210b of the container. More particularly, they allow the detachment means to slide in a plane parallel to the sealing plane P and in the longitudinal direction I which corresponds to the direction of engagement of the refill in the device. Likewise, they provide certain resistance to disengagement in the direction O; that is, in a direction normal to the plane of sealing P.

When the detachment means is moved in the direction F as indicted in FIG. 3, the sliding means prevent any sideways movement of the detachment means with respect to the longitudinal direction I, and this has the effect of distributing the delamination forces almost identically on each side of the lateral edges 210a, 210b. The result of the forces being balanced in this way is that delamination occurs simultaneously along each edge and therefore engenders a lower risk of the sealing means becoming torn.

Figure 4:
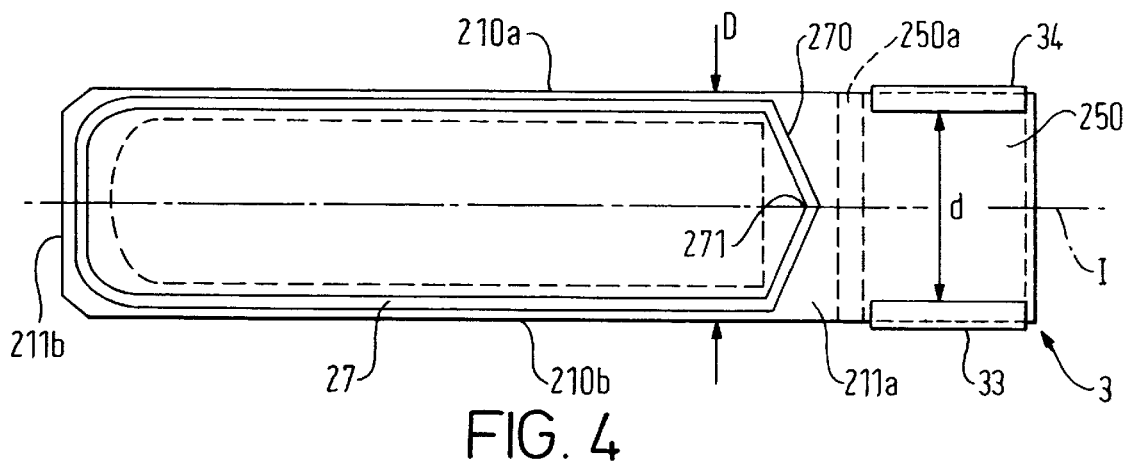
FIG. 4 depicts a view from above of the refill according to the invention in the mode where the detachment means is not folded back.
Figure 5:
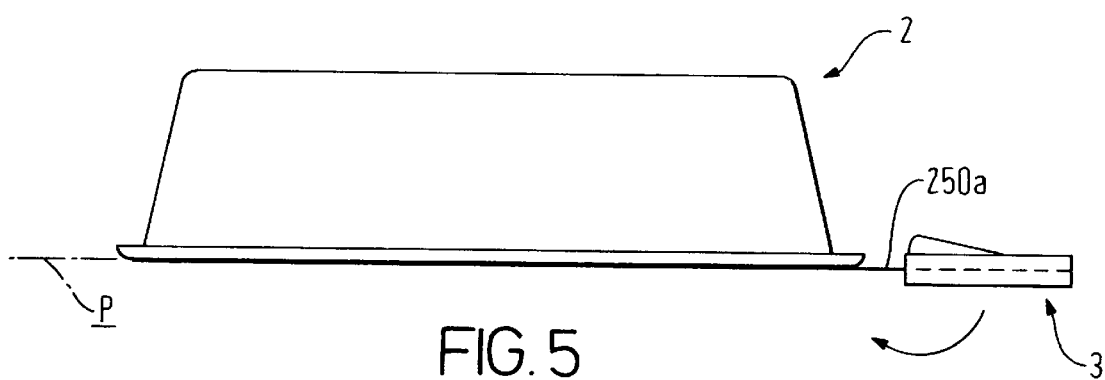
FIG. 5 shows a side view of FIG. 4.
Figure 6:
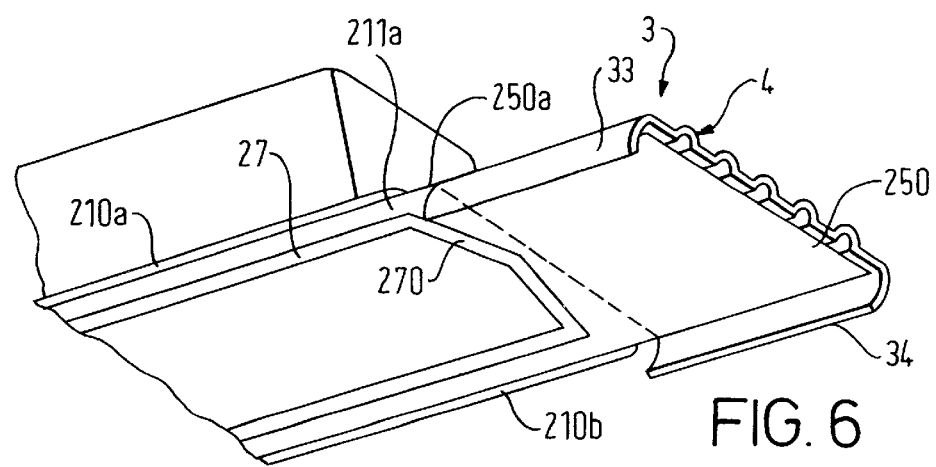
FIG. 6 shows a detailed perspective of FIG. 4.
Figure 7:
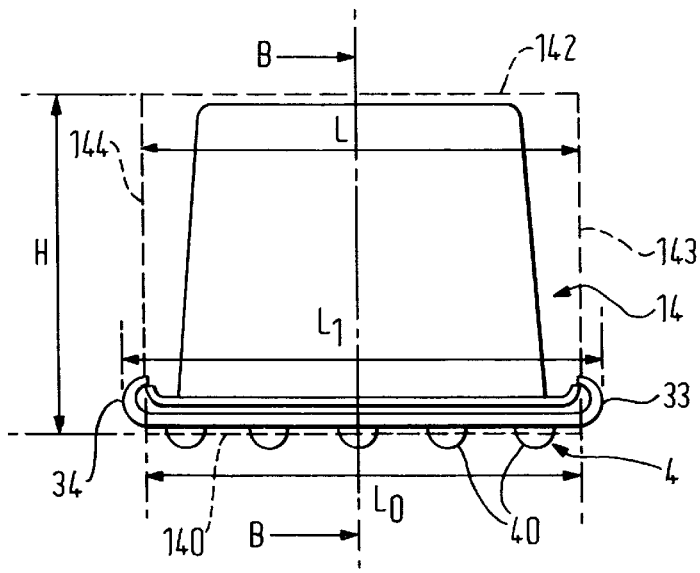
FIG. 7 shows a schematic front view of the refill in the position of engagement in the preparing or dispensing device.

FIGS. 4 to 6 show a configuration of the refill when the detachment means is deployed forming a part extending beyond the container. A configuration such as this corresponds to a configuration for the mounting of the refill. The detachment means 3 is secured to the sealing means by the portion 250 which has at least one fold zone (or even a simple line) 250a adjacent to the front edge 211a of the container. The detachment means is set in place by folding the free part 250 back at the fold zone. To do that, the connecting means 33, 34 have to be flexible enough to be able to move apart beyond the distance D corresponding to the width of the edges 210a, 210b from their initial dimension d. Engagement is therefore achieved by exerting sufficient force on the two sides of the detachment means against the lateral edges so as to cause the curved portions to part, as by manual clipping, for example.

As FIG. 4 shows, the front edge 211a of the container comprises a sealing portion 270 which is subjected to the delamination forces right at the start of the cycle of introducing the refill. As a preference, provision is made for this portion to have a non-linear shape, preferably one having a point or apex 271 pointing in the direction of the free portion and situated more or less in alignment with the longitudinal axis I. A configuration such as this for the front portion 270 makes it possible to offer lower resistance to delamination at the time of starting the delamination by comparison with a portion that was linear and transverse to the longitudinal axis I. The portion may adopt different shapes, such as the shape of an inverted U, V, Y, W or other shape.

Figure 8:
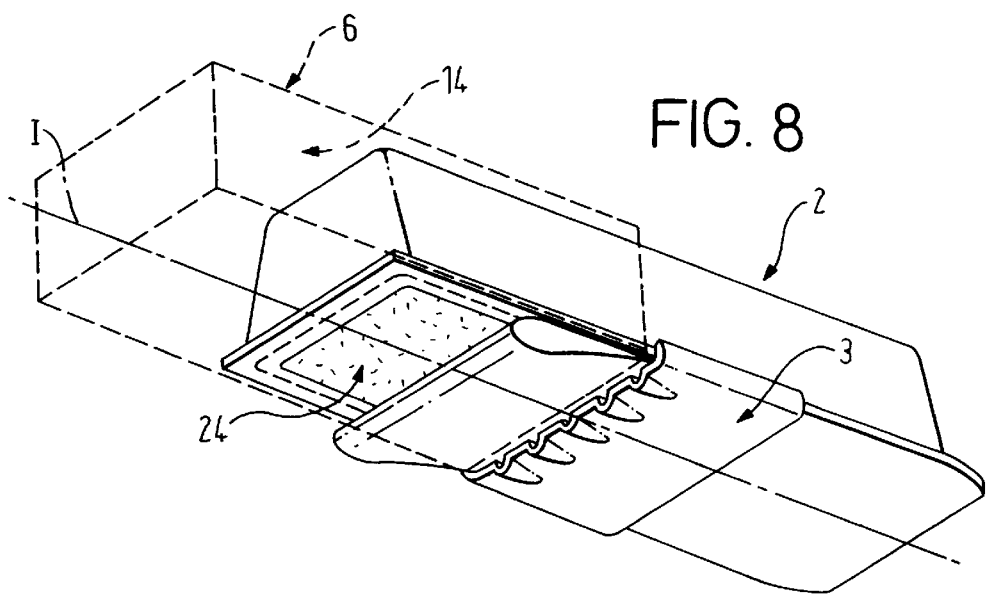
FIG. 8 shows, in perspective from underneath, the principle involved in opening the refill as it is engaged in the device.
Figure 9:
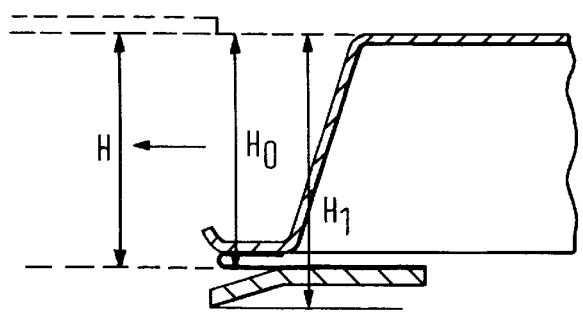
FIG. 9 shows a detail of FIG. 7 in section B—B.

FIGS. 7 to 12 show the refill as it is being introduced into a supply zone 6 of a metering and/or dispensing device 1 designed for this purpose. One of the particular features of the invention lies in the fact that the detachment means has mechanical catching means 4 formed of at least one abutment zone extending transversely to the longitudinal direction of the refill corresponding to the direction of engagement (FIG. 8). In the preferred embodiment illustrated, the mechanical catching means 4 comprises projecting portions 40 intended to bear transversely against a complementary edge 140 delimiting the entry to a housing 14 of the supply zone 6 of the device. The housing 14 has an upper edge 142 which, with the lower edge 140, defines a height H which, given the dimensional tolerances, allows the refill 2 to be engaged in sliding with the exception of the detachment means 3 which is kept outside the housing because of the collaboration in abutment between the projecting portions 40 and the lower edge 140. Thus, the height H is designed to be slightly greater, to within the tolerances, than the height $H_0$ of the refill comprising the edges and the loop portion 250 of the sealing film that forms a double thickness of film as shown in FIG. 9, but less than the height $H_1$ including the overall height of the refill including the thickness of the mechanical catching means.

Advantageously, the sliding means 33, 34 may also form catching means in engagement with lateral edges 143, 144 of the housing belonging to the device. Thus, all that is required is to ensure that the width $L_1$ of the detachment means exceeds the width L of the housing (width separating the edges 143, 144) and that the width $L_0$ separating the sliding edges of the refill is less than the width L of the housing. Such an arrangement has the advantage of concentrating the forces along the sides of the refill; that is to say near the lateral sealing lines, thus encouraging delamination without the risk of rupturing the film.

Figure 10:
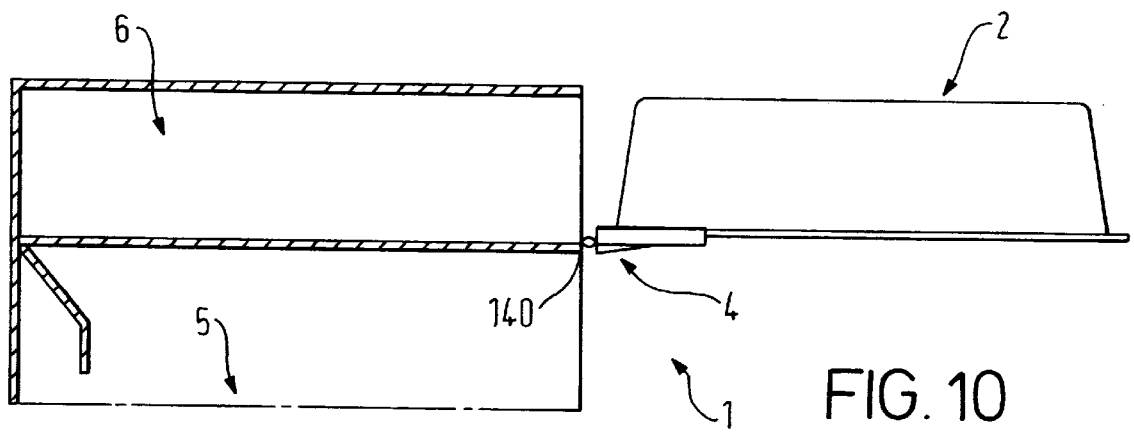
FIGS. 10 to 12 show the operation of engagement into the device for refilling with foodstuff at various stages of engagement.
Figure 11:
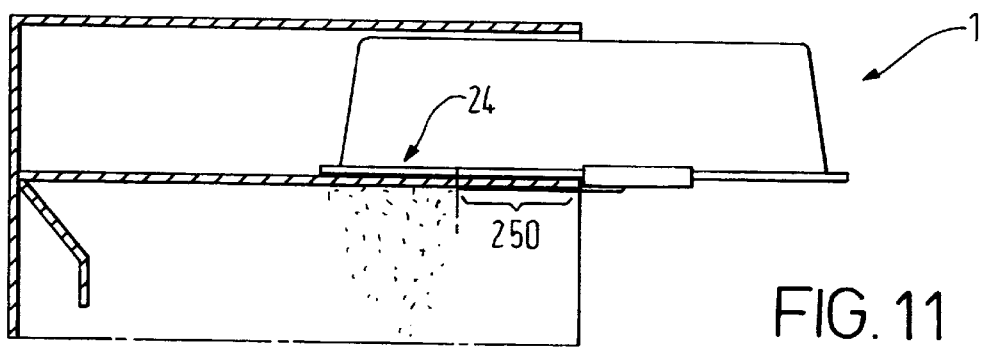
Figure 12:
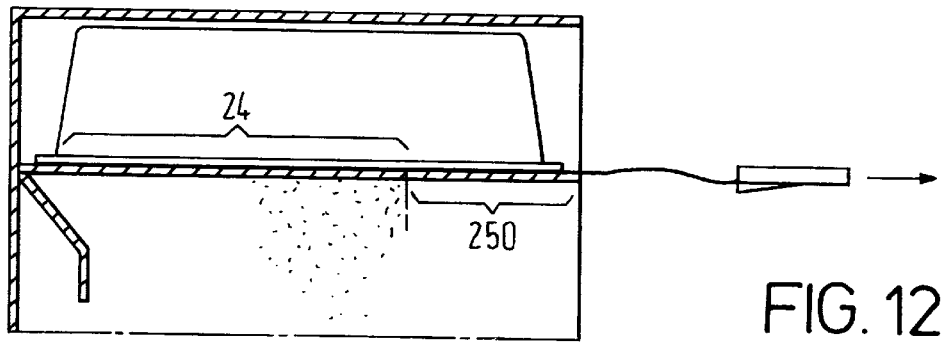

As shown in FIGS. 10 to 12, installing a refill 2 causing unloading is particularly simple and quick because it consists in arranging the refill at the entry to the housing, offering up the front edge of the refill comprising the detachment means in the position in which it is folded back onto the sealing surface (in the configuration according to FIG. 1), and applying the catching means 4 facing the corresponding edge 140 of the housing, then in exerting sufficient force in the longitudinal direction of the refill to push it into the housing, delamination of the sealing means thus occurring along the edges of the refill. It should be noted that as delamination occurs, the foodstuff is released under gravity into the supply zone of the device, towards a metering system 5, for example, without it being possible for there to be a risk of spillage outside the device. The sealing means or film thus forms a folded-back portion 250, the length of which increases as the refill is introduced into the housing. Because the film is folded back in the form of a loop, the length of the folded-back portion approximately corresponds to half the length of the refill engaged in the housing so that when the container is fully introduced into the housing, the passage 24 of the container is approximately half uncovered. At this moment, complete delamination until such time as the sealing means or film is separated from the container is obtained by pulling the detachment means manually as shown in FIG. 12.

A device for dispensing beverages or sauces designed to accommodate such a refill is described in detail in U.S. Pat. No. 6,289,948. Reference can be made to that patent in order to understand, by way of example, the general principle of operation of such a device.

According to one feature of the invention, the sealing means is preferably a flexible film made of a material resistant to tearing and to moisture. This may be either a single-layer or multi-layer plastic film, possibly metallized, or a laminate consisting of a layer of aluminium internally lined with one or more layers of thermally fusible plastic. In the case of soluble coffee, for example, a metallized plastic film is preferred as this confers properties of impermeability to vapor and to gases. Plastic films are generally metallized by condensing aluminium or other metal vapors onto the surface of the film under vacuum. The operation is carried out in a sealed chamber where a very strong vacuum is created. The metallization layer is very thin, of the order of 300 angstroms. It may be covered with a protective lacquer or with complexing with another film bonded onto the metal side. In any event, the film, metallized or otherwise, will have an internal layer capable of forming a sealing line when pressure and heat are applied to the edges of the container so as to form a heat-sealed line.

As to the container, it may have varying shapes and consist of one or more separate parts assembled. However, preference is given to a solution in the form of an elongate tray made of one single piece including the sealing edges.

The refill may be based on a rigid plastic of the type used in a forming process chosen from the following: thermoforming, injection, of extrusion-blow-moulding. The material or materials forming the container may be chosen from various plastics belonging to the group consisting of: polypropylene (PP), polyethylene, polystyrene, PVC, cellulose acetate, EVOH, polyester and polyamides. The container may be a single layer or a multi-layer. It may comprise specific barrier films with low permeability which are impermeable with respect to water vapor and/or oxygen. It may also comprise films having improved welding properties to improve the welding of the edges, or to a film that is of the same type of plastic as the refill to facilitate the welding or bonding operation.

EXAMPLES

The following various solutions may be given by way of preferred examples which illustrate preferred combinations of refill element and sealing means.

Example 1

The container 20 and the detachment means 3 are formed by one-piece injection molding as illustrated in FIG. 13 and are then separated by cutting or rupturing lines 220 as lines of weakness, for example, formed between the two parts. An opening 221 may be provided between the two parts so as to limit the length of the cutting or rupture lines. A sealing film may be sealed prior to separation of the detachment means and of the container. Preference is given to a material of the PP type, which has good permeability to water vapor, good weldability and is relatively inexpensive. By contrast, polypropylene alone is relatively porous to oxygen and is not suited to food products which are sensitive to oxidation, such as powdered milk. A solution such as this is also economical because just one mold is used to manufacture two parts that can be separated by breaking or cutting.

Example 2

In one possible alternative form, the container is formed by thermoforming a single layer such as one made of PP or a multi-layer such as one made of PP/EVOH/PP. The slideway is formed by injection-moulding of PP or some other appropriate plastic such as polystyrene, polyethylene, etc. Thermoforming the container has the advantage of being economical and of being able to produce a container based on multi-layer plastic sheets incorporating one or more barrier layers such as EVOH which is a barrier to oxygen. Thermoforming does not, however, make it possible to obtain a single part comprising the container and the detachment means in as much as the latter has fold or deformation zones in the opposite direction to the direction of forming (in this case, portions bent upwards whereas the forming of the tray is downwards).

Example 3

In yet another alternative form, the container and the detachment means are formed separately by injection moulding a plastic such as PP. The advantage of injection moulding the container by comparison with thermoforming, stems from the possibility of injecting edges precisely and to the desired shapes without forming off-cuts. It is also suited to stiffening the container and preventing it from warping once the film has been sealed. The appearance is also improved.

Example 4

FIGS. 14 to 15 illustrate an alternative form of the invention, in which the refill 2 comprises a container formed of a flexible pouch 28 and of a relatively more rigid end piece 29 which is attached to the flexible pouch by appropriate connecting means 280 such as welding, adhesion by adhesive, or the like. The end piece is equipped at its base with sealing edges, in a similar way to what was described earlier, on which a detachment means 3 capable of sliding along the lateral edges 210a, 210b is mounted. FIG. 15 shows the base of the end piece in engagement with a guide means belonging to the housing of the device in which the refill is intended to be lodged. The guide means is formed of a lower edge 140, of lateral edges 143, 144 and of upper edges 142a, 142b, all this forming a rail intended to guide the lateral edges 210a, 210b of the end piece along a guide plane P of the supply zone. The dimensions of the guide means are designed to be smaller than the dimensions of the detachment means 3 so that introducing the end piece into the guide means causes the detachment means to stop at the entry to the guide means and therefore causes the sealing film covering the opening of the container to delaminate. A refill in the form of a flexible pouch and of a sealed end piece and a device intended to receive such a refill are described in detail in U.S. Pat. No. 6,250,506, the content of which is incorporated into the current application by reference.

The refill of the invention is suited to storing foodstuffs used to refill various types of devices for dispensing, preparing and/or metering food products prepared from these foodstuffs. The foodstuffs envisaged are essentially powdered substances involved in making beverages. Such substances are preferably chosen from roasted ground coffee, soluble instant coffee, tea, milk, chocolate, chicory, plants or vegetables and natural or artificial flavorings and mixtures of these products in any proportions.

What is claimed is:

1. A foodstuff refill intended to be inserted in a foodstuff supply zone of a device for metering, dispensing and/or preparing food products, the refill comprising: a container for containing a quantity of foodstuff; a passage for releasing the foodstuff; at least one pair of first opposed edges; means for sealing the passage to form an enclosed space; means for detaching the sealing means and comprising at least one catching means intended to engage over a retaining means of the device when the refill is being engaged in the device; wherein the detachment means is secured to the sealing means, the detachment means is able to be slidably connected to the first opposed edges in such a way as to be movable along the passage and cause the at least partial opening of the sealing means in response to the engagement of the refill in the device.

2. The refill according to claim 1, wherein the catching means associated with the detachment means is arranged in such a way as to form at least one abutment zone extending transversely with respect to the longitudinal direction (I) of the refill corresponding to the direction in which the refill is inserted into the device.

3. The refill according to claim 1, wherein the detachment means comprises means for connection with the opposed edges which are flexible so that the detachment means can be arranged between a disengaged position and a connection position in which a portion of the sealing means is folded back, thus forming the position of engagement in sliding along the opposed edges.

4. The refill according to claim 3, wherein the connecting means comprises curved end portions of the detachment means, which allow folding in the position of engagement along the edges by elastic deformation when a force is applied to the end portions.

5. The refill according to claim 3, further comprising a pair of second opposed edges, and wherein the sealing means is a flexible film assembled on the first and second edges of the refill by a sealing line so that the sealing means is detached by delaminating at least a portion of the sealing line on the first and second edges of the container.

6. The refill according to claim 5, wherein the second edges include a front edge adjacent to a front portion of the sealing means which front edge is equipped with a sealing portion of non-linear shape forming an apex pointing towards the front portion to assist in delamination of the film from the refill when it is inserted into the device.

7. The refill according to claim 6, wherein the sealing portion is approximately in the shape of an inverted U, V, Y or W.

8. The refill according to claim 1, wherein the container has the shape of an elongate tray and in that the edges form an integral part of the tray.

9. The refill according to claim 1, wherein the container comprises a flexible pouch extended by a relatively rigid end piece comprising the sealing edges.

10. A foodstuff refill intended to be inserted in a foodstuff supply zone of a device for metering, dispensing and/or preparing food products, with the device including a retaining lip and at least one pair of first opposed edges, and the refill comprises: a container for containing a quantity of foodstuff; a passage for releasing the foodstuff; a plastic film for sealing the passage to form an enclosed space; and a detachment member attached to one end of the film and comprising at least one catch member intended to engage the retaining lip of the device when the refill is inserted into the device, wherein the detachment member is connected to the first opposed edges in such a way as to be movable in sliding along the first edges of the device and cause the at least partial opening of the film means in response to the engagement of the detachment with the retaining lip of the device.

11. The refill according to claim 10, wherein the catch member(s) associated with the detachment member is arranged in such a way as to form at least one abutment zone extending transversely with respect to the longitudinal direction (I) of the refill corresponding to the direction in which the refill is inserted into the device.

12. The refill according to claim 10, wherein the detachment member includes a flexible connection portion so that the detachment member can be arranged between a disengaged position and a connection position in which a portion of the film is folded back, thus forming the position of engagement in sliding along the opposed edges.

13. The refill according to claim 12, wherein the flexible connecting portion includes curved end portions which allow folding in the position of engagement along the edges by elastic deformation when a force is applied to the end portions.

14. The refill according to claim 10, further comprising a pair of second opposed edges, and wherein the film is assembled on the first and second edges of the refill by a sealing line so that the film can be detached by delaminating at least a portion of the sealing line on the first and second edges of the container, wherein the second edges include a front edge adjacent to a front portion of the sealing means which front edge is equipped with a sealing portion of non-linear shape forming an apex pointing towards the front portion to assist in delamination of the film from the refill when it is inserted into the device.

15. The refill according to claim 14, wherein the sealing portion is approximately in the shape of an inverted U, V, Y or W, and the container has the shape of an elongate tray and in that the edges form an integral part of the tray.

16. The refill according to claim 10, wherein the container comprises a flexible pouch extended by a relatively rigid end piece comprising the sealing edges.

17. The refill according to claim 10, wherein the foodstuff is a pulverulent foodstuff.

18. An assembly comprising a device for metering, dispensing and/or preparing beverages which comprises a supply zone and at least one foodstuff refill intended to take up position in the zone, wherein the refill is in accordance with claim 1, wherein the detachment means is capable of sliding in such a way that the introduction movement causes the at least partial delamination of the film and releases the foodstuff into the supply zone.

19. An assembly comprising a device for metering, dispensing and/or preparing beverages which comprises a supply zone and at least one foodstuff refill intended to take up position in the zone, wherein the refill is in accordance with claim 10, wherein the detachment member is capable of sliding in such a way that the introduction movement causes the at least partial delamination of the film and releases the foodstuff into the supply zone.

20. An assembly comprising a device for metering, dispensing and/or preparing beverages which comprises a supply zone and at least one foodstuff refill intended to take up position in the zone, wherein the refill comprises a container containing the foodstuff and first and second opposed edges, detachment means comprising at least one mechanical catching means; and a film forming the bottom of the refill, the film being assembled on the edges of the container in such a way that it can be delaminated, and the film being secured to the detachment means; the supply zone comprising a housing for accommodating the refill and at least one retaining means which collaborates with the at least one catching means at the time of introduction of the refill into the housing; wherein the detachment means comprises means allowing a slidable connection with respect to the first exposed edges, and wherein the detachment means is capable of sliding in such a way that the introduction movement causes the at least partial delamination of the film and releases the foodstuff into the supply zone.

* * * * *